3,001,956
PROCESS FOR THE PRODUCTION OF FOAMED ACRYLAMIDE POLYMERS
Karl Meinel, Burghausen, Upper Bavaria, Germany, assignor to Wacker-Chemie G.m.b.H., Munich, Germany, a German firm
No Drawing. Filed Dec. 16, 1959, Ser. No. 859,836
Claims priority, application Germany Dec. 18, 1958
5 Claims. (Cl. 260—2.5)

The present invention relates to a new and improved process for the production of foamed plastic structures from acrylamide polymers and from copolymers of acrylamide with at most 70% by weight of acrylonitrile, acrylic acid or styrene.

It has been found that foamed plastic structures may be produced from acrylamide polymers and acrylamide copolymers with at most 70% by weight of acrylonitrile, acrylic acid or styrene if the polymerization is carried out in an aqueous acid medium under carefully controlled conditions of temperature and acid pH in the presence of a polymerization catalyst and a salt of iron, chromium, vanadium, titanium or manganese. If the polymer or copolymer so obtained is washed free of acid and then molded under heat and pressure to a predetermined form, on subsequently heating the molded object to a temperature of from 150° C. to 240° C. the molded object undergoes a very substantial increase in volume which may be from 10 to 50 times the original volume, depending upon the temperature to which it is heated.

More specifically, polymers and copolymers exhibiting these desirable properties and characteristics are those described above which are obtained when the polymerization is carried out in an aqueous acid medium at a pH of 4 down to that of a 60% aqueous solution of sulfuric acid at a polymerization temperature of 20° C. to 110° C., or at a pH of 4 to 7 at a polymerization temperature of 50° C. to 110° C. It is necessary, of course, that these polymers and copolymers be shaped initially under heat and pressure before they can be converted into foamed plastic structures since if merely heated in their original powder form, the degree to which they expand is insignificant. In addition, it has also been observed that if the amount of the polymerization catalyst present is markedly reduced, for example to a concentration of from 0.3% down to 0.04% on the weight of the monomer present in the polymerization reaction medium, even this slight ability of these polymers and copolymers to form an expanded structure when reduced to a homogeneous molten form by heating at ordinary pressures is lost.

An important object of this invention is the provision of a new and improved process for the production of foamed plastic structures from the aforementioned polymers and copolymers in which the aqueous acid polymerization is carried out with a low catalyst concentration without the necessity of first converting the polymer or copolymer to a specifically shaped or molded object under heat and pressure and then heating the object so obtained.

Other objects of this invention will appear from the following detailed description.

It has now been found that acrylamide polymers, and copolymers obtained in the manner described above by aqueous acid polymerization in presence of a metal salt and a polymerization catalyst but which do not exhibit any ability to yield foamed plastic structures when heated in a molten condition at ordinary pressures may, when subjected to carefully controlled conditions of temperature and pressure, be converted in a continuous manner into the desired foamed plastic structures.

This advantageous result is obtained if said polymers and copolymers are heated to a temperature of about 170° C., say 160° C. to 190° C., and are then subjected to the very rapid application of a high pressure of the order of up to about 2 tons per sq. cm., without removal of the heat of friction which develops by this rapid application of high pressure and the softened polymer formed by this step is then immediately allowed to expand while at the elevated temperature to which it is raised by the frictional heat. Preferably, the time interval to the application of maximum pressure and the total elapsed time until the softened polymer or copolymer is allowed to expand may vary from several seconds to several minutes and depends on the quantity of material employed. In this manner expanded or foamed plastic structures are obtained without the necessity for first producing molded objects which must then be heated in order to form the desired foamed plastic structure.

As brought out above, the process of the present invention is particularly applicable to the production of foamed plastic structures from polymers of acrylamide or copolymers of acrylamide with at most 70% by weight of acrylonitrile, acrylic acid or styrene polymerized in aqueous acid solution in the presence of a suitable polymerization catalyst either at a pH of from 4 to a pH of 7 at a temperature of 50° C. to 110° C. or at an acidity of between pH 4 and that of a 60% aqueous solution of sulfuric acid at a temperature of 20° C. to 110° C. The catalyst employed preferably comprises ammonium persulfate, potassium persulfate, or benzoyl peroxide in an amount of from 0.01% to 1.2% by weight, and the salt of iron, chromium, vanadium, titanium or manganese is preferably employed in an amount of from 0% to 1% on the weight of the monomers present. The polymer or copolymer formed is then washed free of acid and dried.

In accordance with the process of my invention, the formation of the desired foamed plastic structures is believed to take place due to the very rapid compression which the powdered polymer is subjected to under the temperature and pressure conditions described. This theoretical concept is believed to be valid since it has been observed that any prior working or manipulation of the polymer appears to impair the ability of the polymer to yield foamed plastic structures.

The pressures which may be employed in the present process may vary rather widely. The minimum suitable pressure is that required to produce the necessary degree of compression, that is a pressure of up to about 2 tons per sq. cm., while the maximum pressure employed is limited only by the compressibility of the plastic mass which is being converted into the desired foamed plastic structure.

A particular advantage of the present process lies in the fact that the amount of metal salts employed in the catalytic polymerization may be greatly reduced yet desirable foamed plastic structures may still be obtained in a continuous manner with relatively little manipulation.

The processing of the polymer at high pressure and at elevated temperature followed by the immediate expansion of the polymer to a foamed plastic structure while at elevated temperature may be carried out in many known ways but may be carried out most advantageously employing the usual screw-feed injection molding machine into which the normally powdered polymer is fed. The polymer is discharged from the heated nozzle of the injection molding machine in the form of a shaped cylinder or other cross section of the foamed plastic depending upon the shape of the discharge orifice provided at the discharge nozzle.

In order further to illustrate this invention, the following examples are given:

Example 1

0.635 part by weight of acrylonitrile are introduced drop by drop at a temperature of 95° C. to 100° C. in 1.24 parts by weight of 90% sulfuric acid containing 0.025 part by weight of ferrous sulfate and 0.09 part by weight of methylene blue. The solution obtained is then diluted with 1.24 parts by weight of water. After the addition of 0.365 part by weight of acrylonitrile the polymerization is effected at 75° C. to 95° C. with stirring with the dropwise addition of 20 grams of a 33% by weight aqueous solution of ammonium persulfate. The copolymer formed is filtered off, washed free of acid and dried. The copolymer is obtained in the form of a powder. When this powder is fed to an injection molding machine provided with a stuffer and having an extrusion head heated to a temperature of 170° C. the copolymer is discharged from the extrusion head in the form of a continuous, foamed plastic cylinder having a specific gravity of from 0.03 to about 0.05. However, if the copolymer powder is first molded into a formed object under heat and pressure, subsequent heating to a temperature as high as 230° C. under ordinary atmospheric pressure does not convert the initially molded object into a foamed plastic.

Example 2

The copolymerization described in Example 1 is repeated but the ferrous sulfate added is reduced to 0.003 part by weight. The ability of the copolymer obtained to form a foamed plastic structure is again clearly demonstrated when the powdered copolymer is fed to an injection molding machine in which the head is heated to a temperature of 170° C. The powdered copolymer is converted to a foamed plastic cylinder with a 20-fold to 30-fold increase in volume.

Example 3

1 part by weight of acrylamide is dissolved in four parts by weight of a 0.5% aqueous solution of sulfuric acid. After heating to 80° C., the addition of about five drops of an aqueous 33% solution of ammonium persulfate is sufficient to initiate the polymerization. A precipitate forms which is separated and washed with methanol. After being dried, the particles are fed to an injection molding machine and extruded at a molding temperature of 170° C. and under a pressure of 1 ton/cm.$^2$ in the form of a foamed plastic cylinder exhibiting a 25-fold increase in volume over the original particles.

Example 4

1 part by weight of acrylamide is dissolved in 1.5 parts by weight of 60% aqueous sulfuric acid and 0.001 part by weight of ferrous sulfate is added. With the solution at a temperature of 80° C., the addition of 0.04 part by weight of ammonium persulfate over the course of two hours results in the precipitation of a white, tough polymer which is washed free of sulfuric acid with water. The polymer is fed to a screw stuffer at a head temperature of 170° C. and under a pressure of 2 tons/cm.$^2$. The polymer expands to thirty times its original volume being extruded as a foamed plastic structure.

Example 5

A mixture of 1 part by weight of acrylamide and 0.43 part by weight of acrylonitrile is dissolved in 3 parts by weight of a 45% aqueous solution of sulfuric acid which contains 0.0015 part by weight of ferrous sulfate and the mixture polymerized at a temperature of 80° C. by the addition of 0.03 part by weight of ammonium persulfate. The precipitated polymerizate is washed free of sulfuric acid with water and methanol. When dry, the polymerizate is a white powder. The latter is then fed to an injection molding device whose extrusion head is maintained at 170° C. and the polymer extruded at a pressure of 1 ton/cm.$^2$. The polymer expands 50-fold in volume and is extruded in cylindrical form.

This application is a continuation-in-part of copending application Serial No. 738,004, filed on May 27, 1958, now U.S. Patent No. 2,990,381.

I claim:

1. In a process for the production of foamed plastic structures of polymers selected from the group consisting of a homopolymer of acrylamide monomer and copolymers of acrylamide monomer with at most 70% by weight of said copolymer of a member of the group consisting of acrylonitrile, acrylic acid and styrene monomer, which monomeric materials are polymerized at a temperature of 20° C. to 110° C. in an aqueous acid medium within an acidity range of an aqueous 0.5% to 60% sulfuric acid solution and containing ammonium persulfate as polymerization catalyst and up to 4% on the weight of the monomers of ferrous sulfate, the polymers obtained being then washed free of acid and dried, the steps which comprise heating the so-obtained polymer to a temperature of 160° C. to 190° C., while rapidly and continuously applying to the heated polymer a pressure of up to about 2 tons per sq. cm. and then immediately and continuously releasing the pressure and allowing the softened polymer to expand at the temperature attained.

2. Process in accordance with claim 1 wherein the initial temperature to which the dry polymer is heated is about 170° C.

3. Process in accordance with claim 1 wherein the pressure, conversion and expansion of said plastic mass is effected under injection molding conditions.

4. Process in accordance with claim 1 wherein the polymerization catalyst is present in an amount not exceeding 1.2% on the weight of the monomers present.

5. Process in accordance with claim 1 in which the polymer is extruded after being converted to a homogeneous mass by being subjected to the heat and pressure developed under injection molding conditions.

No references cited.